US008800108B2

(12) United States Patent
Tanimoto et al.

(10) Patent No.: US 8,800,108 B2
(45) Date of Patent: Aug. 12, 2014

(54) DUST COLLECTOR

(75) Inventors: Hideyuki Tanimoto, Hitachinaka (JP);
Takuya Konnai, Hitachinaka (JP);
Kouji Sagawa, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 261 days.

(21) Appl. No.: 12/974,523

(22) Filed: Dec. 21, 2010

(65) Prior Publication Data
US 2011/0146025 A1 Jun. 23, 2011

(30) Foreign Application Priority Data
Dec. 21, 2009 (JP) ................................ 2009-289183

(51) Int. Cl.
*A47L 9/22* (2006.01)
(52) U.S. Cl.
USPC ............. 15/412; 310/268; 310/208; 15/327.1
(58) Field of Classification Search
CPC .................................................... A47L 9/2842
USPC .................... 15/412, 413; 310/268, 208, 266; 417/423.2
See application file for complete search history.

(56) References Cited

U.S. PATENT DOCUMENTS

| 2,364,877 | A | * | 12/1944 | Smellie | 55/294 |
|---|---|---|---|---|---|
| 3,997,806 | A | * | 12/1976 | Noto et al. | 310/268 |
| 4,949,002 | A | * | 8/1990 | Ibe et al. | 310/268 |
| 5,804,905 | A | * | 9/1998 | Knoerzer | 310/268 |
| 6,196,802 | B1 | * | 3/2001 | Matsumoto | 416/229 R |
| 6,232,696 | B1 | * | 5/2001 | Kim et al. | 310/156.37 |
| 7,232,292 | B2 | * | 6/2007 | Lopatinsky et al. | 417/423.1 |
| 2001/0005919 | A1 | * | 7/2001 | Worden et al. | 15/413 |
| 2005/0057112 | A1 | * | 3/2005 | Lopatinsky et al. | 310/208 |
| 2008/0203847 | A1 | * | 8/2008 | Ito et al. | 310/234 |

FOREIGN PATENT DOCUMENTS

| JP | 42-019041 | 9/1942 | |
|---|---|---|---|
| JP | 2-275095 A | 11/1990 | |
| JP | 7-039480 A | 2/1995 | |
| JP | 7-298589 A | 11/1995 | |
| JP | 2009-024573 A | 2/2009 | |
| JP | 2009-078079 | 4/2009 | |
| JP | 2009078079 A * | 4/2009 | A47L 9/00 |

OTHER PUBLICATIONS

JP 2009078079 (machine translation), 2009.*
Japanese Office Action with English translation issued in Japanese Application No. 2009-289183 dated Sep. 10, 2013.

* cited by examiner

*Primary Examiner* — Mark Spisich
*Assistant Examiner* — Andrew A Horton
(74) *Attorney, Agent, or Firm* — McDermott Will & Emery LLP

(57) ABSTRACT

A dust collector comprises a tank having an intake opening; a head unit mounted on the tank; a motor provided on the head unit and having a rotor, a stator and an output shaft; a fan provided on the head unit and rotating under power from the motor, for sucking air or liquids into the tank from the intake opening; and a filter housed in the tank, that separates dust from the air or liquid sucked into the tank. The rotor has a coil disc having multiple roughly annular coils arranged in a circumferential direction centered on the output shaft in the direction of the axial line of the output shaft. The stator has a magnetic flux generation mechanism that generates magnetic flux that passes through the coil disc in the direction of the axial line of the output shaft.

3 Claims, 8 Drawing Sheets

DUST COLLECTOR

CROSS-REFERENCE TO RELATED APPLICATION

This application claims the benefit of Japanese Patent Application No. 2009-289183, filed Dec. 21, 2009, the entire disclosure of which is incorporated by reference herein.

FIELD

This application relates generally to a dust collector that sucks up dust and liquids, with a motor as the drive source.

BACKGROUND

In Unexamined Japanese Patent Application KOKAI Publication No. 2009-078079, a dust collector is disclosed that is composed of a tank having an intake opening, a head unit having a motor and a fan, and a filter for separating dust and the like from air sucked into the tank. In this dust collector, the tank is composed of an upper tank and a lower tank engaged so as to be capable of sliding. It is possible to alter the height of the tank and to alter the height of the dust collector by sliding the upper tank and the lower tank. In general, it is preferred that dust collectors be small in overall size while having large tank capacity (dust collection capacity). However, in the above-described dust collector, when the upper tank and the lower tank are slid in order to reduce the overall height, tank capacity also becomes smaller.

SUMMARY

In consideration of the foregoing, it is an object of the present invention to provide a dust collector that is more compact relative to tank capacity.

In order to achieve the above object, the dust collector according to a first aspect of the present invention has:
a disk motor having a discoid coil disk;
a fan rotating under power from the disk motor,
a tank having space for containing collected dust;
a head unit covering the tank; and
a filter separating dust from the air or liquid sucked by the rotation of the fan.

Preferably, an output shaft of the disk motor is substantially perpendicular to the horizon.

Preferably, the discoid coil disc comprises a printed wiring board where a conductor pattern of the coil piece is formed.

Preferably, the disk motor has a rotor, a stator, and an output shaft provided coaxially with the rotor;
the rotor comprises a flange having a flat surface substantially perpendicular to the axial line of the output shaft; and
the coil disc is provided on the rotor and is supported by the flat surface of the flange.

Preferably, the flange is made from a magnetic material and covers the plurality of coil pieces of the coil disc.

Preferably, the disk motor has a rotor, a stator, and an output shaft provided coaxially with the rotor; and
the rotor and the fan is provided together so as to be adjoined to each other in the direction of the axial line of the output shaft.

Preferably, the fan is provided with a basal plate having a flat surface substantially perpendicular to the axial line of the output shaft; and
the basal plate and the rotor are arranged adjacent to each other in the direction of the axial line of the output shaft.

Preferably, wherein a portion of the air separated by the filter passes around the disk motor in an axial line direction of an output shaft of the disk motor.

In order to achieve the above object, the dust collector according to a second aspect of the present invention has:
a tank having an intake opening, and an opening that opens upward;
a head unit mounted on the tank and covering the opening;
a motor provided in the head unit and having a rotor, a stator, and an output shaft provided coaxially with the rotor, one out of the rotor and the stator including a coil disc with a plurality of coil pieces arranged in a circumferential direction around the output shaft as viewed from a direction of an axial line of the output shaft, and another of the rotor and the stator including a magnetic flux generation mechanism that generates magnetic flux passing through the coil disc in the direction of the axial line of the output shaft, the axial line of the output shaft being positioned substantially vertically;
a fan provided in the head unit and rotating under power from the motor, that sucks air or liquid into the tank from the intake opening; and
a filter housed in the tank that separates dust from the air or the liquid sucked into the tank.

Preferably, the coil disc comprises a printed wiring board where a conductor pattern of the coil piece is formed.

Preferably, the rotor further comprises a flange having a flat surface substantially perpendicular to the axial line of the output shaft; and
the coil disc is provided on the rotor and is supported by the flat surface of the flange.

Preferably, the flange is made from a magnetic material and covers the plurality of coil pieces of the coil disc.

Preferably, the rotor and the fan is provided together so as to be adjoined to each other in the direction of the axial line of the output shaft.

Preferably, the fan is provided with a basal plate having a flat surface substantially perpendicular to the axial line of the output shaft; and
the basal plate and the rotor are arranged adjacent to each other in the direction of the axial line of the output shaft.

Preferably, the magnetic flux generation mechanism is provided with a magnet.

Preferably, the dust collector further comprises brushes provided on the head unit and supplying electrical power to the rotor by making contact with the rotor;
wherein the brushes are provided so as to be exchangeable from the outside.

Preferably, a portion of the air separated by the filter passes around the motor in an axial line direction of the output shaft of the motor.

With the present invention, it is possible to provide a dust collector that is more compact relative to tank capacity by reducing the size of the head unit having the fan and the motor.

BRIEF DESCRIPTION OF THE DRAWINGS

A more complete understanding of this application can be obtained when the following detailed description is considered in conjunction with the following drawings, in which.

DETAILED DESCRIPTION (Embodiment 1)

Figure 1:
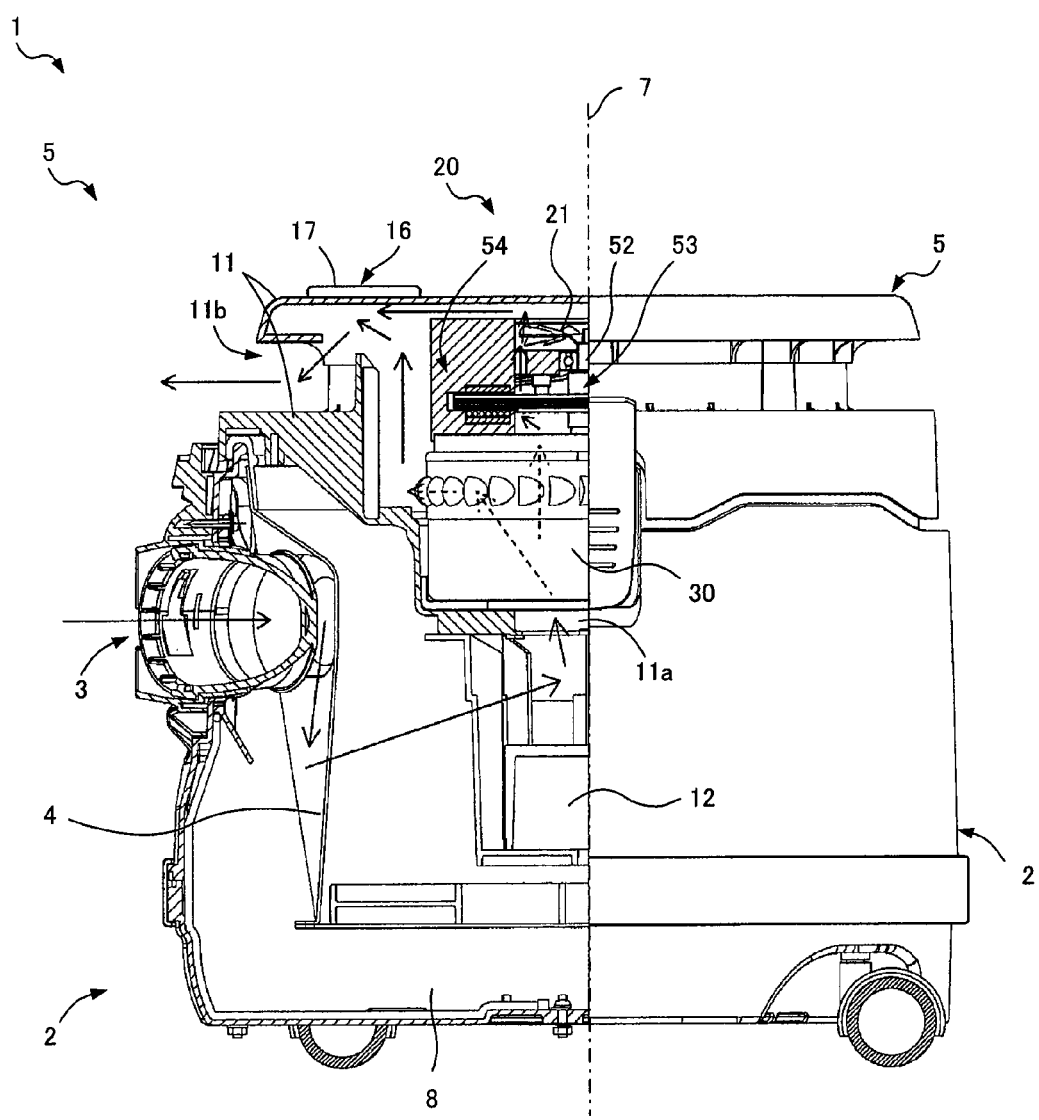
FIG. 1 is a side cross-sectional view of a dust collector according to a first embodiment of the present invention.

FIG. 1 is a side cross-sectional view of a dust collector 1 according to a first embodiment. FIG. 1 shows one example of the appearance of the dust collector cut along the axial line of rotation (axial line 7) of the below-described motor 20. The axial line 7 of the motor 20 is arranged substantially vertically. The dust collector 1 is composed of a tank 2 in which dust and the like is collected, a filter 4 that separates the air and the dust and the like sucked into the tank 2, and a head unit 5 mounted on the tank 2.

The tank 2 is formed in the shape of a cylinder having a bottom and has an opening that opens upward. In addition, an intake opening 3 that opens substantially perpendicularly to the axial line 7 is formed in the tank 2. A non-illustrated hose for sucking dust and liquids in is removably connected to the intake opening 3.

The filter 4 is formed in the shape of a cylinder having a bottom and has an opening that opens upward while the diameter expands, and is housed in the tank 2. The top edge of the filter 4 is engaged to the top of the tank 2 over the entire perimeter. Through this, a dust collection space 8 for accumulating dust and the like is formed between the tank 2 and the filter 4.

The head unit 5 is composed of a casing 11 formed on the outer edge of the head unit 5, a motor housed in the casing 11, a cooling fan 21 for cooling the inside of the casing 11, a fan 30 that is rotated by power from the motor 20, and a float 12 capable of moving up and down along the axial line 7.

The casing 11 is mounted on and anchored to the top edge of the tank 2 so as to cover the openings in the tank 2 and the filter 4. A motor 20 and a fan 30 are housed in the casing 11. In addition, a ventilation opening 11a that opens to the inside of the filter 4 along the axial line 7 is formed on the bottom face of the casing 11, and a exhaust opening 11b that opens to the outside (outside air) substantially perpendicular to the axial line 7 is formed on the top face of the casing 11. In addition, an operation panel 16 having a switch 17 and the like for driving/halting the motor 20 is provided on the top surface of the casing 11.

Figure 2:
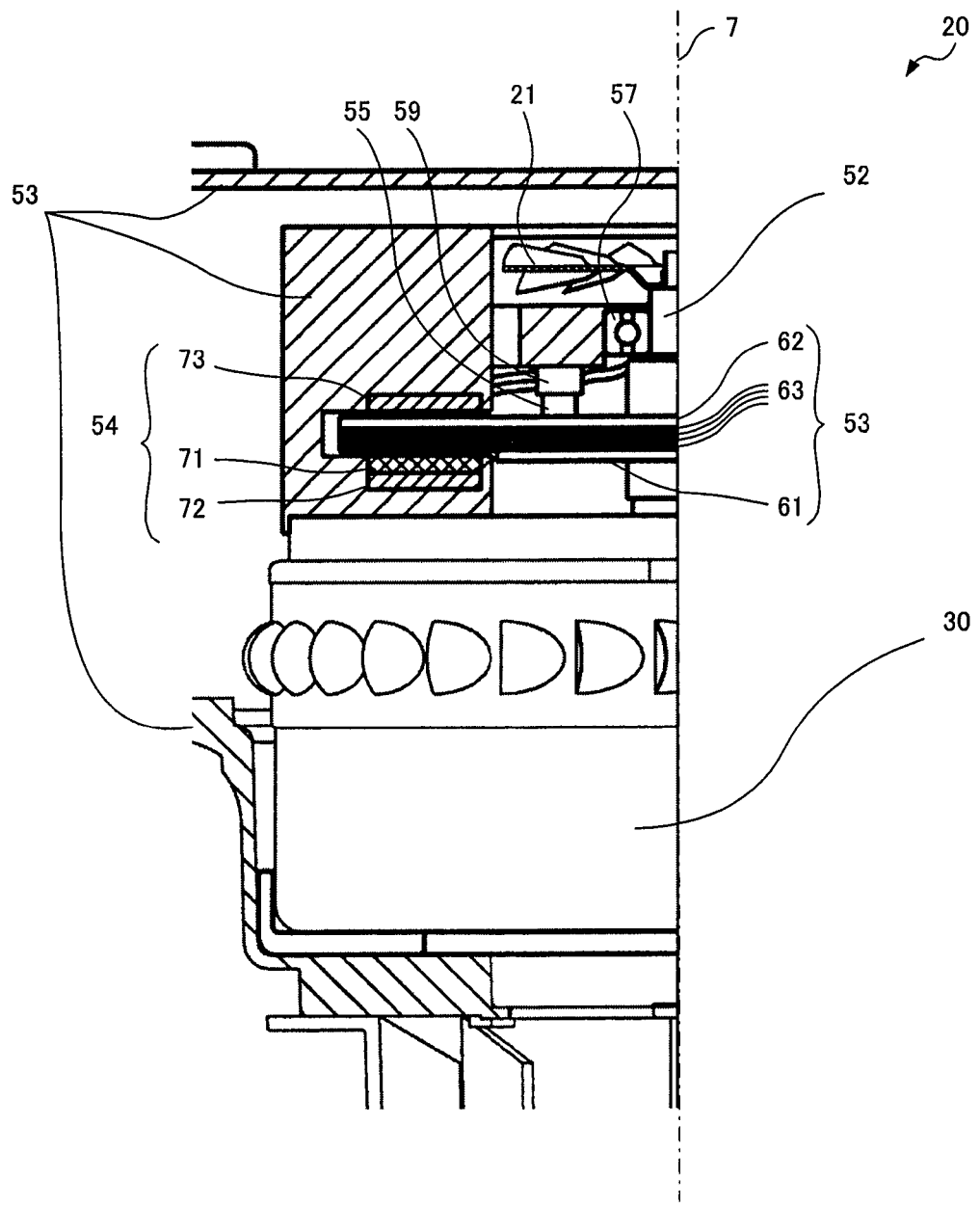
FIG. 2 is a partial enlarged view showing an enlargement of the motor and fan shown in FIG. 1.

The motor 20 is composed as a commutator motor that receives electricity and outputs power to an output shaft 52, and as shown in FIG. 2, is composed of the output shaft 52, a rotor 53 that rotates integrally with output shaft 52, a stator 54 fixed to the casing 11, and a pair of brushes (sliders) 55 fixed to the casing 11.

The output shaft 52 is rotatably supported about the axial line 7 by non-illustrated bearings and bearings 57 provided in the casing 11. The top end of the output shaft 52 is connected to the cooling fan 21, and the lower end of the output shaft 52 is connected to the fan 30.

Figure 3:
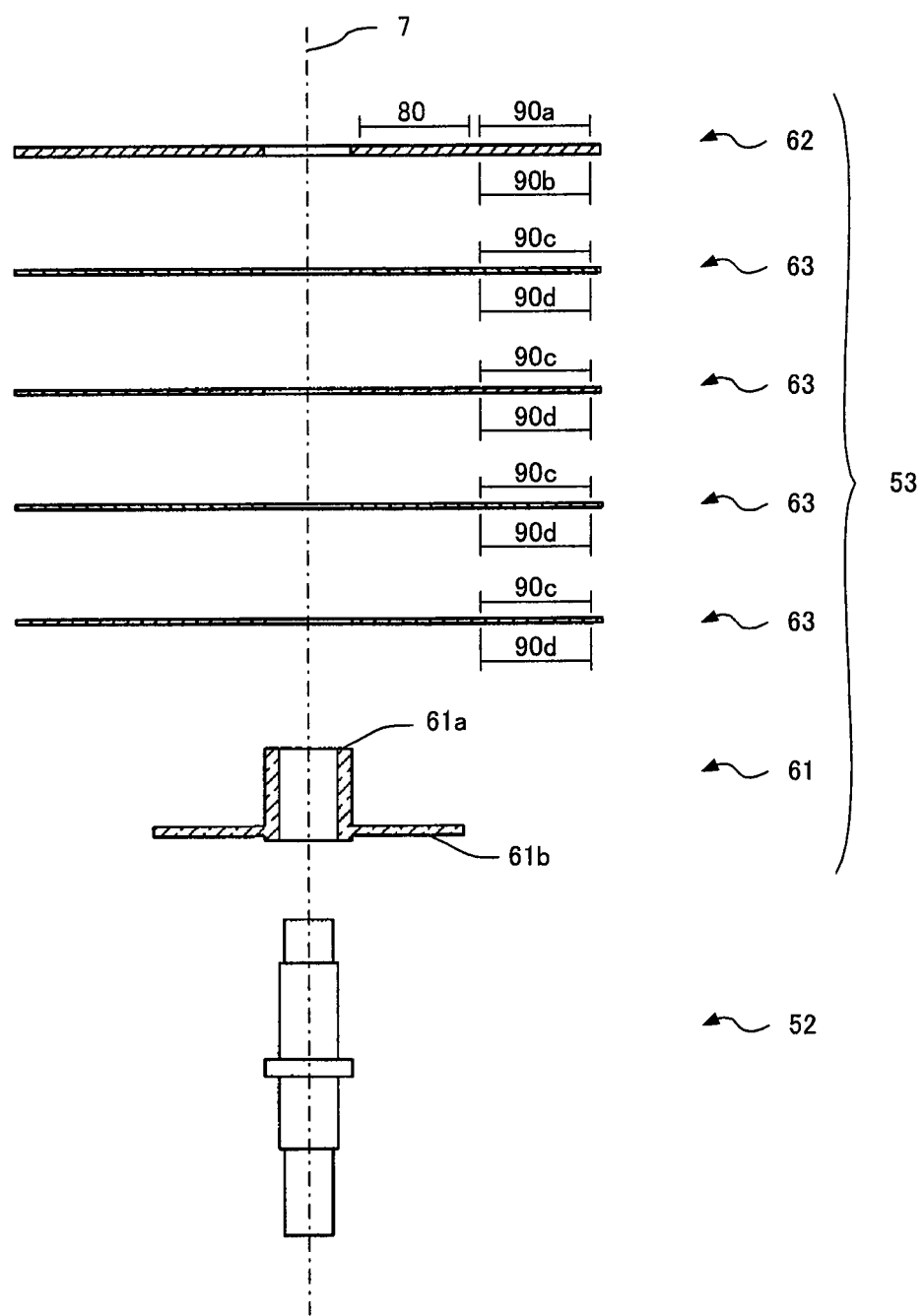
FIG. 3 is a cross-sectional view showing the disassembled rotor and output shaft shown in FIG. 2.

The rotor 53 is provided coaxially with the output shaft 52 and is formed in a disc shape centered on the axial line 7. As shown in FIG. 3, the rotor 53 is composed of a flange 61, a coil/commutator disc 62 and four coil discs 63.

The flange 61 is formed of, for example, an aluminum alloy, and has a cylindrical fixing member 61a around the axial line 7 and a discoid support member 61b protruding in a direction substantially vertical to the axial line 7 from the outer circumference surface of the fixing member 61a. The flange 61 has the fixing member 61a fixed to and engaged with the output shaft 52 so as not to rotate alone, and rotates together with the output shaft 52.

The coil/commutator disc 62 and the coil disc 63 are each a print wiring board including an insulating substrate and a conductor pattern. The coil/commutator disc 62 and the coil disc 63 are each formed in a discoid shape having substantially same internal diameter and external diameter around the axial line 7, and are stacked together on the support member 61b of the flange 61 with the coil/commutator disc 62 being the outermost layer.

As shown in FIG. 3, provided on the top face of the coil/commutator disc 62 are a commutator area 80 where a commutator conductor pattern is formed, and a coil area 90a where a coil conductor pattern is formed. The commutator area 80 and the coil area 90a are each provided as an annular area around the axial line 7, and the coil area 90a is arranged outwardly of the commutator area 80. Moreover, provided on the bottom face of the coil/commutator disc 62 is a coil area 90b for forming a coil conductor pattern. The coil area 90b is provided as an annular area around the axial line 7, and is arranged so as to overlap the coil area 90a as viewed from the direction of the axial line 7.

Figure 4:
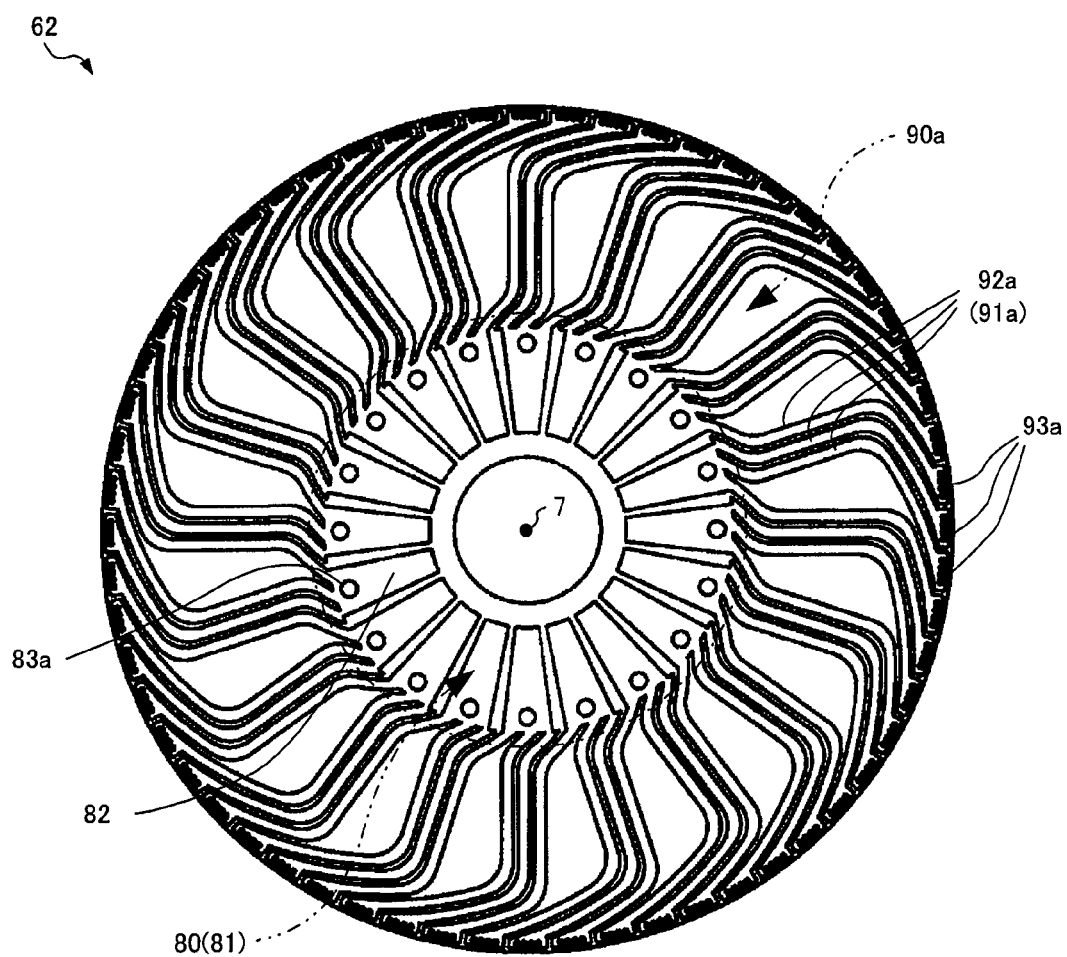
FIG. 4 is a top view showing the conductive pattern of the coil/commutator disc shown in FIG. 3.

As shown in FIG. 4, the commutator area 80 on the top face of the coil/commutator disc 62 has a commutator 81 formed by the conductor pattern. The commutator 81 comprises a plurality of commutator pieces 82 formed radially around the axial line 7. A through hole 83a that passes all the way through the coil/commutator disc 62 is formed in the outer end of each commutator piece 82.

The coil area 90a on the top face of the coil/commutator disc 62 has a plurality of coil pieces 92a formed by the conductor pattern and formed radially around the axial line 7. Each coil piece 92a has an inner end directly connected to the corresponding commutator piece 82. Moreover, each coil piece 92a has an outer end bent in a predetermined direction around the axial line 7. A plurality of through holes 93a passing all the way through the coil/commutator disc 62 are formed in the outer end of each coil piece 92a.

The coil area 90b on the bottom face of the coil/commutator disc 62 has a plurality of non-illustrated coil pieces formed by the conductor pattern similar to that of the coil area 90a shown in FIG. 4 and formed radially around the axial line 7. The outer end of each non-illustrated coil piece is connected to the corresponding coil piece 92a of the coil area 90 through a solder filled in the through holes 93a. Moreover, the inner end of each non-illustrated coil piece is connected to the corresponding commutator piece 82 of the commutator area 80 through a solder filled in the through hole 83a. Accordingly, the plurality of coil pieces 92a of the coil area 90a and the plurality of non-illustrated coil pieces of the coil area 90b form a plurality of coils 91a formed in a substantially annular shape (substantially rectangular shape with a side being omitted) as viewed from the direction of the axial line 7. The plurality of coils 91a are arranged in a circumferential direction around the axial line 7. The end of each coil 91a is connected to the corresponding commutator piece 82 of the commutator area 80.

As shown in FIG. 3, coil areas 90c, 90d where coil conductor patterns are formed are provided on the top face and the bottom face of the coil disc 63, respectively. The coil areas 90c, 90d are each formed in an annular shape around the axial line 7, and are arranged so as to overlap the coil areas 90a, 90b of the coil/commutator disc 62.

Figure 5:
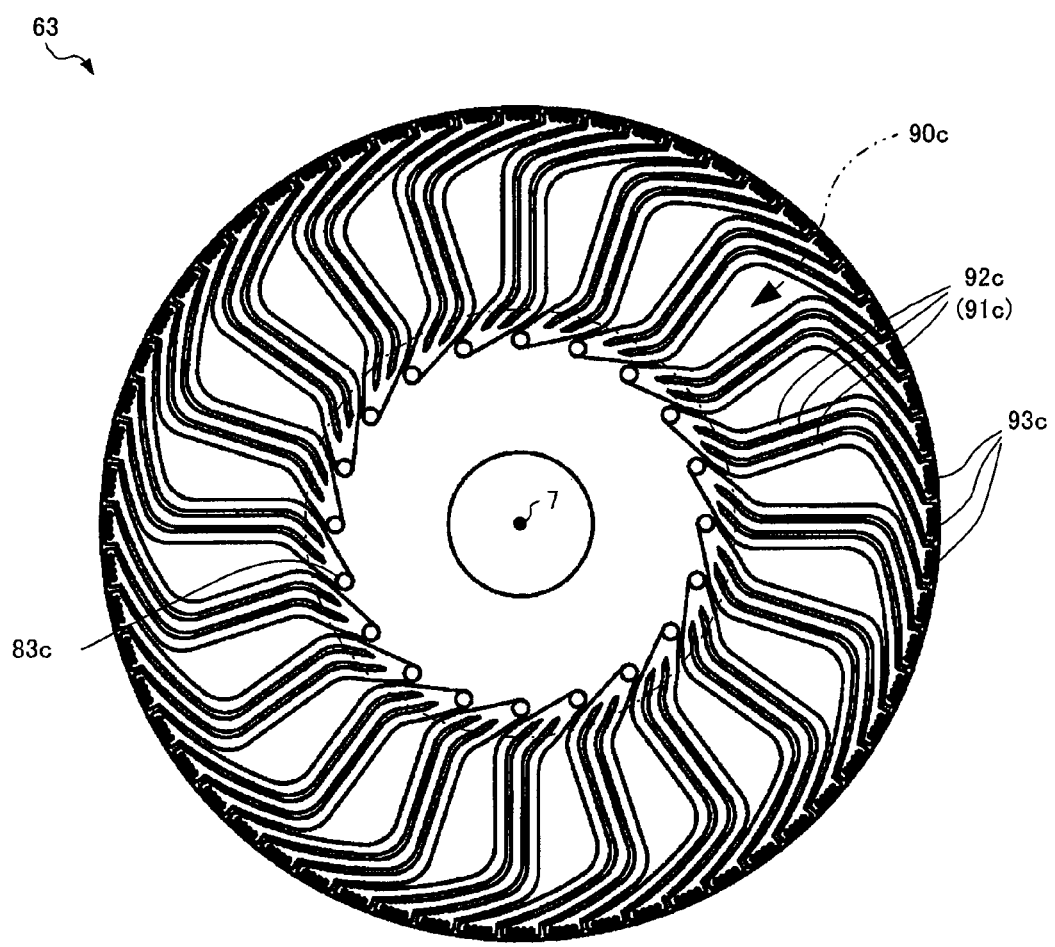
FIG. 5 is a top view showing the conductive pattern of the coil disk shown in FIG. 3.

The coil areas 90c, 90d of the coil disc 63 have conductor patterns similar to those of the coil areas 90a, 90b of the coil/commutator disc 62. As shown in FIG. 5, the coil area 90c on the top face of the coil disc 63 has a plurality of coil pieces 92c formed radially around the axial line 7. Moreover, the coil area 90d on the bottom face of the coil disc 63 has a plurality of non-illustrated coil pieces formed by the similar conductor pattern to that of the coil area 90c. The plurality of coil pieces 92c of the coil area 90c and the plurality of non-illustrated coil pieces of the coil area 90d are respectively connected through solders filled in respective through holes 83c, 93c passing all the way through the coil disc 63, and form a plurality of coils 91c formed substantially in an annular (substantially rectangular shape with a side being omitted) as viewed from the direction of the axial line 7. The plurality of coils 91c are arranged in a circumferential direction around the axial line 7. The end of each coil 91c is connected to the corresponding commutator piece 82 through a solder filled in the through hole 83a of the coil/commutator disc 62.

Respective conductor patterns of the commutator area 80 and the coil area 90a of the coil/commutator disc 62 are formed on the same print wiring. Respective conductor patterns of the commutator area 80 and the coil area 90a of the coil/commutator disc 62 are formed so as to be thicker than that of the coil area 90b and those of the coil areas 90c, 90d of the coil disc 63 in order to suppress a damage originating from ablation with the brushes 55.

The coil/commutator disc 62 and the coil disc 63 are stacked together via a non-illustrated insulating layer in such a way that, for example, the coils 91a, 91c overlap as viewed from the direction of the axial line 7 or the coils 91a, 91c are arranged with a predetermined angle around the axial line 7.

As shown in FIG. 2, the stator 54 comprises a magnet 71 that is a permanent magnet, and a pair of yokes 72, 73. The pair of yokes 72, 73 are each formed of a magnetic material like iron in an annular discoid shape, and are fixed to the casing 11. The yoke 72 is arranged so as to face the bottom face of the rotor 53, more specifically, so as to face the coil area 90d (see FIG. 3) of the coil disc 63. The yoke 73 is arranged so as to face the top face of the rotor 53, more specifically, so as to face the coil area 90a (see FIG. 3) of the coil/commutator disc 62. The magnet 71 is formed in an annular shape with a plurality of magnetic poles arranged in a circumferential direction, and is fixed to the top face of the yoke 72. Accordingly, the pair of yokes 72, 73 form a magnetic path so that magnetic fluxes generated by the magnet 71 pass through the coil/commutator disc 62 and the coil disc 63 in the direction of the axial line 7. The magnet 71 and the yokes 72, 73 constitute a magnetic flux generation mechanism of the present invention.

The pair of brushes 55 are held by a pair of brush holders 59 fixed to the motor case 11 so as to make contact with (slidingly contact) the top face of the rotor 53, more specifically, so as to slidingly contact the pair of commutator pieces 82 of the coil/commutator disc 62 (see FIG. 4), and are arranged across the axial line 7. The brushes 55 are urged toward the top face of the rotor 53 by urging means like a non-illustrated spring provided at the brush holders 59. The brush 55 is formed of a carbon with an electrical conductivity, and is connected to the above-explained power-source circuit.

The fan 30 is joined coaxially to the output shaft 52 of the motor 20 and is housed in the casing 11. The fan 30 rotates under power from the motor 20 and sucks air in the filter 4 into the casing 11 via the ventilation opening 11a.

The float 12 is positioned below the casing 11 in the filter 4, and is composed so as to be capable of moving up and down along the axial line 7. The float 12 rises in accordance with the level of fluid sucked into the tank 2 and acts to cover the ventilation opening 11a of the casing 11 when the fluid level in the tank 2 becomes higher than a predetermined height.

According to the dust collector 1 having the above-explained structure, as the switch 17 is actuated, a predetermined voltage is applied to the brushes 55 of the motor 20 from the non-illustrated power-source circuit. The voltage applied to the brushes 55 is applied to the coils 91a, 91c of the rotor 53 through the commutator 81. Thereafter, the coils 91a, 91c of the rotor 53 form magnetic fluxes in the direction of the axial line 7 by the stator 54 as explained above, a current starts flowing in the direction vertical to the magnetic fluxes and perpendicular to the axial line 7 by the applied voltage through the commutator 81, and rotational force is generated at the rotor 53 around the axial line 7. Accordingly, the rotor 53, the output shaft 52 fixed to the rotor 53, and the fan 30 connected to the output shaft 52 rotate together as the axial line 7 being a rotational axis.

As the fan 30 rotates, air along with dust and liquid are sucked into the dust collection space 8 (tank 2) from the intake opening 3. Dust sucked into the dust collection space 8 is separate from air and liquid by the filter 4 and accumulates in the dust collection space 8. Air separated from the dust by passing through the filter 4 is sucked into the casing 11 via the ventilation opening 11a. A large portion of the air sucked into the casing 11 flows in the outward radial direction of the fan 30 while rotating along with the fan 30 and is blown out from the exhaust opening 11b. A portion of the air sucked into the case 11 passes through the fan 30 in the direction of the axial line 7, cools the motor 20, passes through the cooling fan 21 and is blown out from the exhaust opening 11b. In addition, liquid sucked into the tank 2 is accumulated in the tank 2. The float 12 rises in accordance with the level of liquid accumulated in the tank 2, and when the level of the liquid in the tank 2 reaches a predetermined level, is sucked toward the ventilation opening 11a by the sucking power generated by the fan 30 and covers the ventilation opening 11a. Through this, sucking from the intake opening 3 is halted, thereby preventing the casing 11 from being submerged, liquid being ejected from the exhaust opening 11b or backward flowing of liquid from the intake opening 3.

As explained above, the motor 20 with the foregoing structure comprises the rotor 53 including the discoid coil/commutator disc 62 and coil disc 63 having the coils 91a, 91c arranged in the circumferential direction around the axial line 7 (the axial line of the output shaft 52), and the stator 54 including the magnet 71 and the yokes 72,73 which generate magnetic fluxes passing through the coil/commutator disc 62 and the coil disc 63 in the direction of the axial line 7. Accordingly, in comparison with the motor of a conventional dust collector.

Moreover, the coil/commutator disc 62 and the coil disc 63 configuring the rotor 53 of the motor 20 each comprise a print wiring board where the conductor pattern of the coil 91a or 91c is formed. Accordingly, in comparison with a motor having a coil wound around a so-called core formed of a magnetic material like iron, the rotor 53 is light-weighted, so that the motor 20 is light-weighted and is quick to actuate. Moreover, because the rotor 53 has no so-called coil end (a bent portion out of a core in a coil wound around the core), the motor 20 can be further flat and small in size, and heat generation by the coils 91a, 91c can be suppressed. Furthermore, because the surface area of the rotor 53, i.e., the heat dissipation area is large, the motor 20 has a good cooling efficiency for the coils 91a, 91c. Therefore, output declines in the motor 20 caused by overheating of the coils 91a and 91c can be suppressed, and it is possible for example to simplify the means of cooling the coils 91a and 91c, such as shrinking or omitting the cooling fan 21 connected to the output shaft 52 of the motor Furthermore, because the dust collector 1 of the above-explained structure has the above-explained flat and small motor 20, it is possible to reduce the height of the casing 11 housing the motor 20 and the fan 30 without reducing the tank capacity. Accordingly, it is possible to provide a more compact dust collector 1 relative to tank capacity.

In addition, by having the coil/commutator disc 62 and the coil discs 63 supported by the support unit 61b of the flange 61, it is possible to improve the durability of the coil/commutator disc 62 and the coil discs 63 and to improve the durability of the motor by suppressing warping of the coil/commutator disc 62 and the coil discs 63 caused by the sucking power (repellent force) received from the stator 54 and the load received from the brushes 55.

(Embodiment 2)

Figure 6:
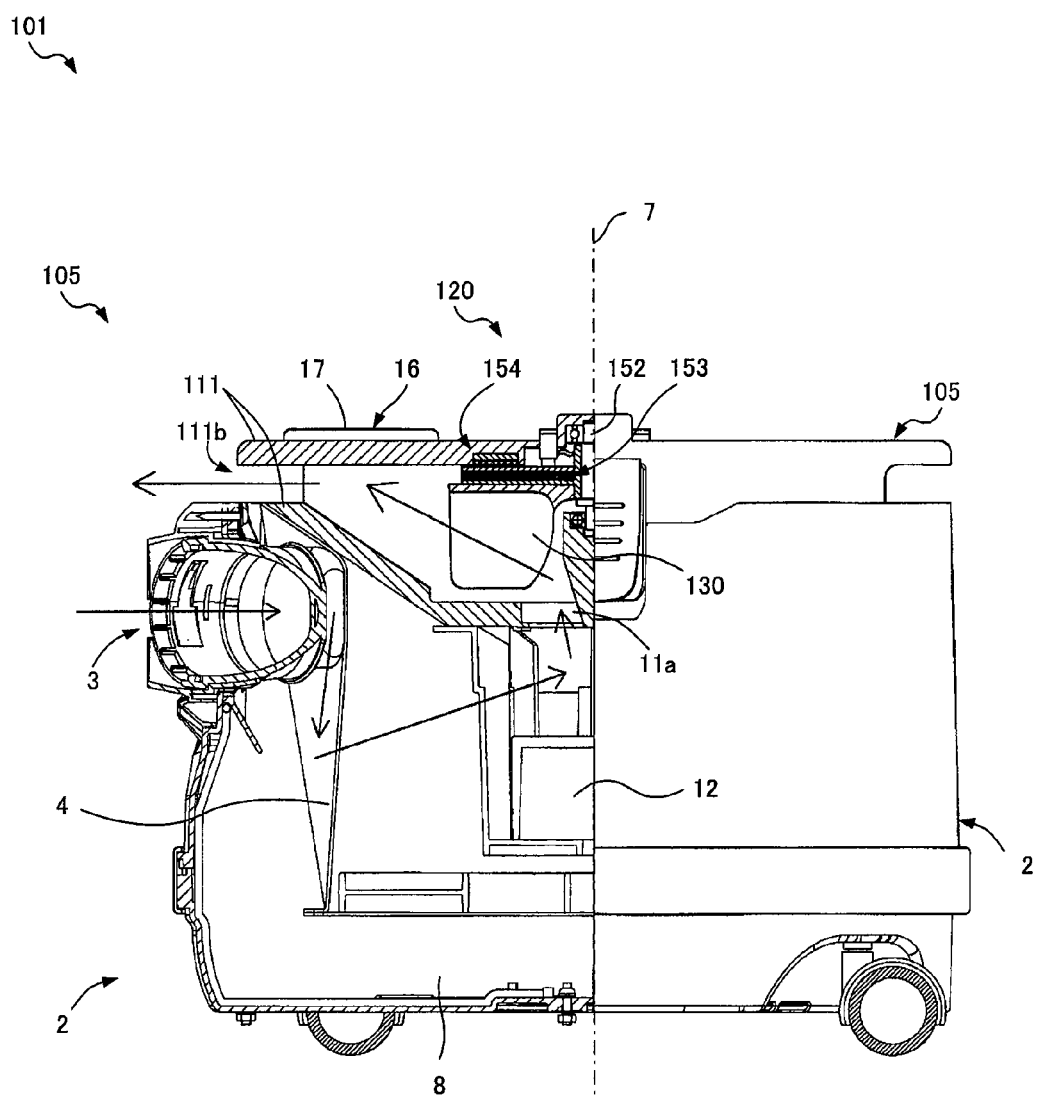
FIG. 6 is a side cross-sectional view showing a dust collector according to a second embodiment of the present invention.

FIG. 6 is a side cross-sectional view showing a dust collector 101 according to a second embodiment. The dust collector 101 primarily differs from the dust collector 1 (see FIG. 1) of the first embodiment in the method of joining a motor 120 and a fan 130. The dust collector 101 is described in detail below, but compositions common to the dust collector 1 of the first embodiment and the dust collector 101 of the second embodiment are labeled with the same symbols and explanation of such is omitted here.

Figure 7:
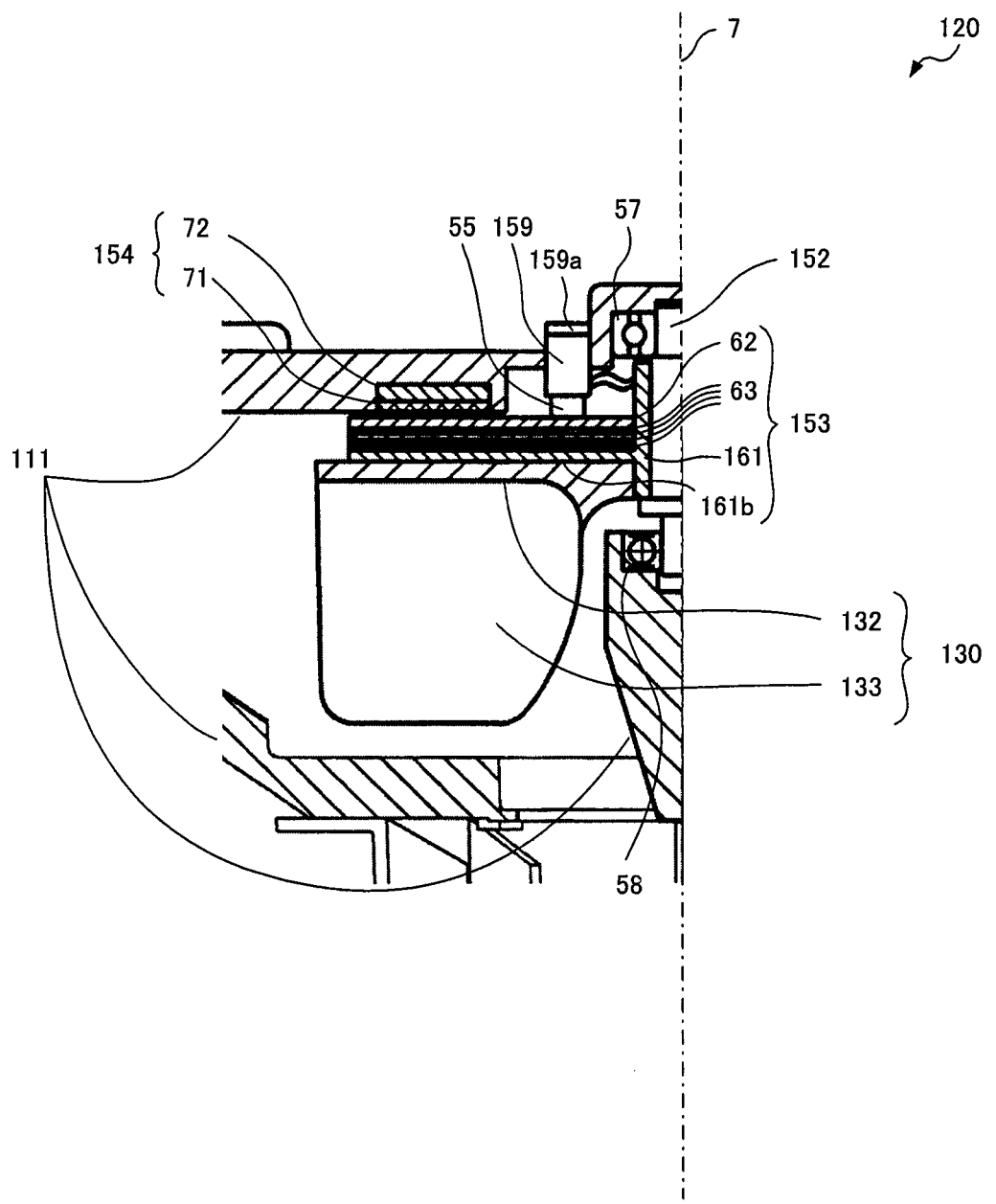
FIG. 7 is a partial enlarged view showing an enlargement of the motor and fan shown in FIG. 6.

As shown in FIG. 7, an output shaft 152 of the motor 120 is supported so as to be able to rotate about the axial line 7 by a pair of bearings 57 and 58 provided on a casing 111. In the motor 120, the cooling fan 21 shown connected to the output shaft 52 in the first embodiment is omitted.

A rotor 153 of the motor 120 is composed of a flange 161, the above-described coil/commutator disc 62 and the above-described coil discs 63. The flange 61 according to the first embodiment is made of aluminum alloy or the like, but the flange 161 of the present embodiment is made of a magnetic material such as iron. In addition, a support unit 161b of the flange 161 has an outer diameter substantially equal to that of the coil/commutator disc 62 and the coil discs 63, and is formed so as to cover the entire bottom surface of the coil discs 63, in other words so as to cover the coil region 90d of the coil discs 63 (see FIG. 3).

A stator 154 of the motor 120 is composed of the magnet 71 and the yoke 72 and is fixed to the casing 111 so as to face the top surface of the coil/commutator disc 62, or more specifically so as to face the coil region 90a (see FIG. 3).

The yoke 72 and the flange 161 (support unit 161b) form a magnetic circuit such that magnetic flux generated by the magnet 71 passes through the coil/commutator disc 62 and the coil discs 63 in the direction of the axial line 7. That is to say, the magnet 71, the yoke 72 and the flange 161 (the support unit 161b) constitute the magnetic flux generation mechanism of the present invention.

In a brush holder 159 of the second embodiment, a screw-on cap 159b is provided from the top of the casing 11, and the brushes 55 are provided so as to be exchangeable by removing the cap 159b without needing to disassemble the casing 111.

A fan 130 is a centrifugal fan composed of a disc-shaped basal plate 132 having a flat surface substantially perpendicular to the axial line 7, and multiple blades 133 extending toward the side away from the motor 120 from the basal plate 132. The flange 161 and the fan 130 are such that the support unit 161b of the flange 161 and the basal plate 132 of the fan 130 are adjacent in the direction of the axial line 7, and for example are integrally provided through adhesion, bonding or molding. That is to say, the rotor 153 and the fan 130 are adjacent in the direction of the axial line 7 and are integrally provided.

With such a dust collector 101 according to the second embodiment, the same effect as with the above-described dust collector 1 according to the first embodiment can be achieved, and the rotor 153 and the fan 130 are adjacent in the direction of the axial line 7 and are integrally provided, so it is possible to reduce the height of the casing 111 in the direction of the axial line 7, so it is possible to make the dust collector 101 even more compact.

Furthermore, the basal plate 132 of the fan 130 and the rotor 153 (the support unit 161b of the flange 161) have mutually adjacent parallel flat surfaces, so it is possible to make the dust collector 101 even more compact by further reducing the height of the casing 111.

In addition, the flange 161 is made from magnetic material and covers the coil region 90d of the coil discs 63, and through this the flange 161 functions as a yoke, making it possible to omit the yoke 73 shown in the first embodiment, thereby making it possible to further reduce the height of the casing 111 and to make the dust collector even more compact.

In addition, the brushes 55 are provided so as to be exchangeable from the outside without needing to disassemble the casing 111, making maintenance of the dust collector 101 easy.

(Variation)

The present invention is not limited to the above-described embodiments, for various variations that fall within the scope of the Claims are also included in the technological scope of the present invention.

For example, the shape of the coils formed on the coil disc and the positioning of the electrodes in the magnetic flux generation mechanism can be arbitrarily changed as long as a commutator motor can be comprised.

In addition, the magnetic flux generation mechanism according to the present invention is not limited to one composed of a magnet, and may, for example, be composed of a coil, an electromagnet or the like so long as magnetic flux is generated that passes through the coil disc in the direction of the axial line of the output shaft of the motor.

In addition, the dust collectors 1 and 101 of the embodiments has motors 20 and 120 that are commutator motors composed of a rotor 153 having a coil/commutator disc 62 and a coil discs 63, and a stator 54 and 154 having a magnet 71, but the dust collector according to the present invention is not limited to this, for example, for the device may be equipped with a brushless motor, composed of a rotor having a magnet and a stator having a coil disc.

Figure 8:
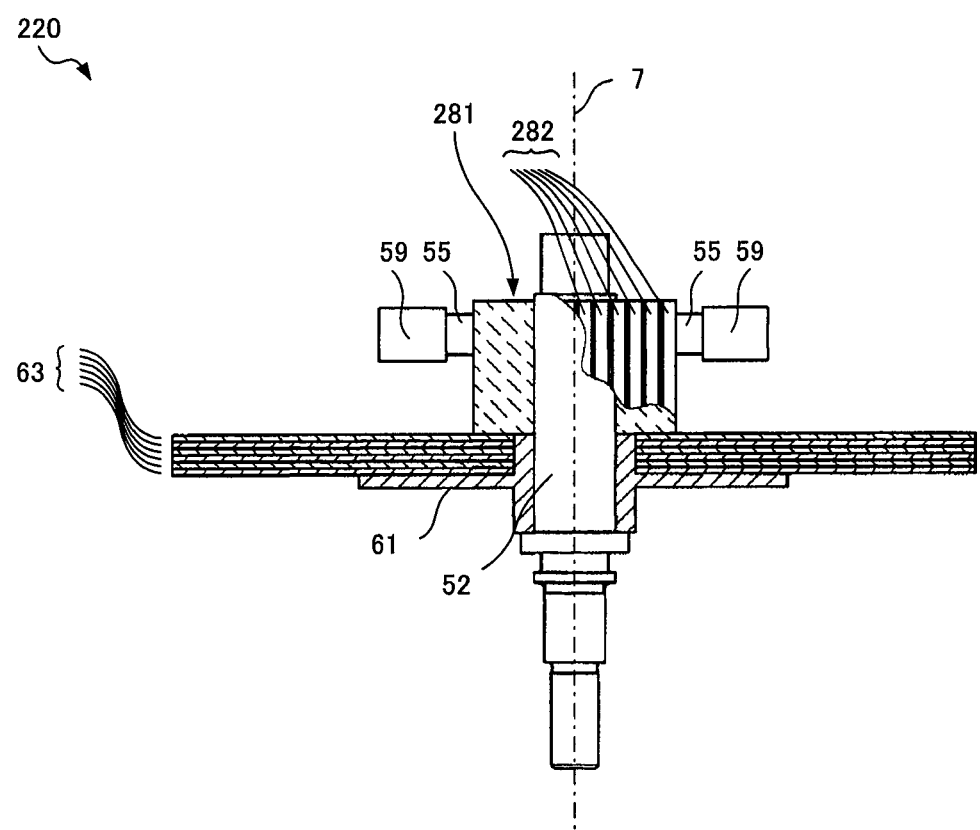
FIG. 8 is a partial cross-section of a variation of the motor shown in FIG. 2.

In addition, the motors 20 and 120 of the embodiments are equipped with a commutator 81 formed by a conductive pattern on the top surface of the coil/commutator disc 62, but the motor according to the present invention is not limited to this, for example, as in the motor 220 shown in FIG. 8, for a cylindrical commutator 281 positioned on the top surface of the coil discs 63 may be provided. The commutator 281 of the motor 220 is composed of multiple commutator pieces 282 arranged on the cylinder side surface centered on the axial line 7, and each commutator piece 282 is formed through mechanical processing and is electrically connected to the corresponding coil 91c of the coil discs 63. In addition, the pair of brushes 55 is positioned so as to slidingly contact the outer perimeter surface of the commutator 281 from a direction substantially perpendicular to the axial line 7. In the motor 220 of this variation, the brushes 55 contact the outer perimeter surface of the commutator 81 from a direction substantially perpendicular to the axial line 7, so surface shaking is less likely to occur accompanying warping of the rotor 54 or the force received from the brushes 55, and rotation of the rotor 54 and the contact between the rotor 54 and the brushes 55 is stable in comparison to the brushes 55 contact the commutator 81 in the direction along the axial line 7. In addition, the commutator pieces 282 formed through mechanical processing or the like can easily be formed more thickly in comparison to commutator pieces 82 formed through conductive patterns, so damage from friction with the brushes 55 can be suppressed. Furthermore, the brushes 55 are positioned so as to extend in a direction substantially perpendicular to the axial line 7, so it is possible to suppress the effect of the length of the brushes 55 on the height of the dust collector. Through this, by making the length of the brushes 55 larger than the length of the commutator 281 in the direction of the axial line 7, it is possible to compose a brush 55 with a longer life while reducing the height of the dust collector. Accordingly, with the motor 220 having the above-described composition, it is possible to more easily realize a highly efficient, long-lasting motor in comparison to the motor 20 of the first and second embodiments.

In addition, the coil/commutator disc 62 and the coil discs 63 according to the embodiments are composed of printed wiring boards, but the coil disc according to the present invention is not limited to this and may, for example, be composed of multiple thin coils or the like arranged in a disc shape.

In addition, the fans 30 and 130 of the embodiments are directly connected to the flange 161 of the motor 120 or the output shaft 52 of the motor 20, but the fan according to the present invention is not limited to this and may, for example, be connected to the output shaft of the motor via a power transfer member such as a gear or a belt or the like so long as the fan can rotate under the power of the motor.

In addition, the compositions shown in the above-described embodiments and variation may be combined.

The materials, shapes, numbers and positioning of various compositions may be appropriately changed within the scope of achieving the object of the present invention.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A dust collector, comprising:
    a disk motor having a discoid rotor, a stator, and an output shaft provided coaxially with the discoid rotor;
    a fan rotating under power from the disk motor;
    a tank having space for containing collected dust;
    a head unit covering the tank;
    a filter separating dust from air or liquid sucked into the tank;
    a ventilation opening that opens to an inside of the filter along an axial line of the output is formed on a bottom face of the head unit, wherein:
    the discoid rotor comprises a flange having a flat surface substantially perpendicular to an axial line of the output shaft,
    the fan is integrally provided with the flat surface of the flange, and extends from the flat surface of the flange toward the ventilation opening, and
    the discoid rotor and the fan are integrally provided so as to be adjacent to each other in a direction of the axial line of the output shaft.

2. The dust collector according to claim 1, wherein the discoid rotor comprises a printed wiring board where a conductor pattern of a coil piece is formed.

3. The dust collector according to claim 1, wherein the flange is made from a magnetic material and covers a plurality of coil pieces of a coil disc.

* * * * *